United States Patent
Otani et al.

(10) Patent No.: US 6,697,395 B2
(45) Date of Patent: Feb. 24, 2004

(54) SUM FREQUENCY LIGHT GENERATION METHOD AND SUM FREQUENCY LIGHT GENERATION APPARATUS ADAPATBLE FOR WIDE-BAND WAVELENGTH CONVERSION

(75) Inventors: Akihito Otani, Atsugi (JP); Toshinobu Otsubo, Atsugi (JP); Hidehiko Takara, Yokosuka (JP); Ippei Shake, Yokohama (JP); Satoki Kawanishi, Yokohama (JP)

(73) Assignees: Anritsu Corporation, Tokyo (JP); Nippon Telegraph & Telephone Corporation, Tokyo (JP)

(*) Notice: Subject to any disclaimer, the term of this patent is extended or adjusted under 35 U.S.C. 154(b) by 11 days.

(21) Appl. No.: 10/096,037

(22) Filed: Mar. 12, 2002

(65) Prior Publication Data

US 2002/0141459 A1 Oct. 3, 2002

(30) Foreign Application Priority Data

Mar. 15, 2001 (JP) .................................. 2001-074683

(51) Int. Cl.[7] ................................................ H01S 3/10
(52) U.S. Cl. ........................................... 372/27; 372/21
(58) Field of Search .................................... 372/21, 27

(56) References Cited

U.S. PATENT DOCUMENTS

| 5,243,611 A | * | 9/1993 | Hyuga et al. ............... 372/22 |
| 5,388,113 A | * | 2/1995 | Oka ............................. 372/21 |
| 6,044,094 A | * | 3/2000 | Govorkov ..................... 372/21 |
| 6,154,309 A | * | 11/2000 | Otani et al. ................. 359/326 |
| 6,256,327 B1 | * | 7/2001 | Goldberg ..................... 372/22 |
| 6,396,601 B1 | * | 5/2002 | Takara et al. ............... 359/110 |

OTHER PUBLICATIONS

H. Takara et al. "Eye–Diagram Measurement of 100 Gbit/s Optical Signal Using Optical Sampling", 22nd European Conference On Optical Communication (1996, Oslo) ThB. 1.2, pp. 4.7 to 4.10.*

* cited by examiner

*Primary Examiner*—Paul Ip
*Assistant Examiner*—Leith Al-Nazer
(74) *Attorney, Agent, or Firm*—Frishauf, Holtz, Goodman & Chick, P.C.

(57) ABSTRACT

A nonlinear optical crystal allowing type 2 phase matching multiplexes a fixed wavelength light having an angular frequency $\omega_D$ and a variable wavelength light having an angular frequency $\omega_S$, with the polarization directions thereof being perpendicular to each other, so as to produce a sum frequency light having an angular frequency $\omega_D+\omega_S$. When multiplexing the fixed wavelength light and the variable wavelength light through the nonlinear optical crystal, a controlling section controls the polarization direction of the fixed wavelength light so as to be parallel to a predetermined reference axis within a plane vertical to a phase matching direction of the nonlinear optical crystal. Even when the wavelength of inputted light is changed, the predetermined reference axis is a single axis which maintains parallelism with the crystal axis of the nonlinear optical crystal.

9 Claims, 7 Drawing Sheets

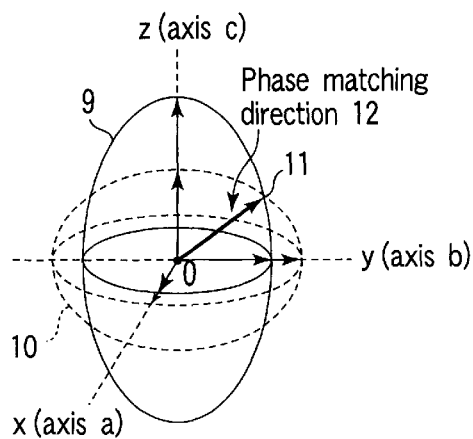
F I G. 4A
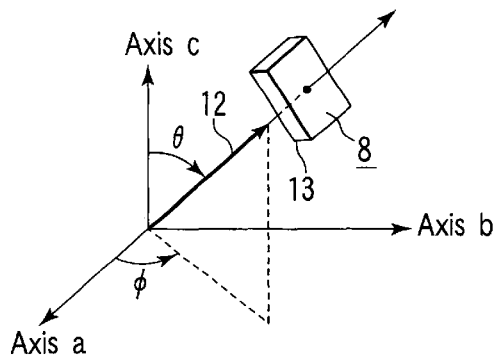
F I G. 4B
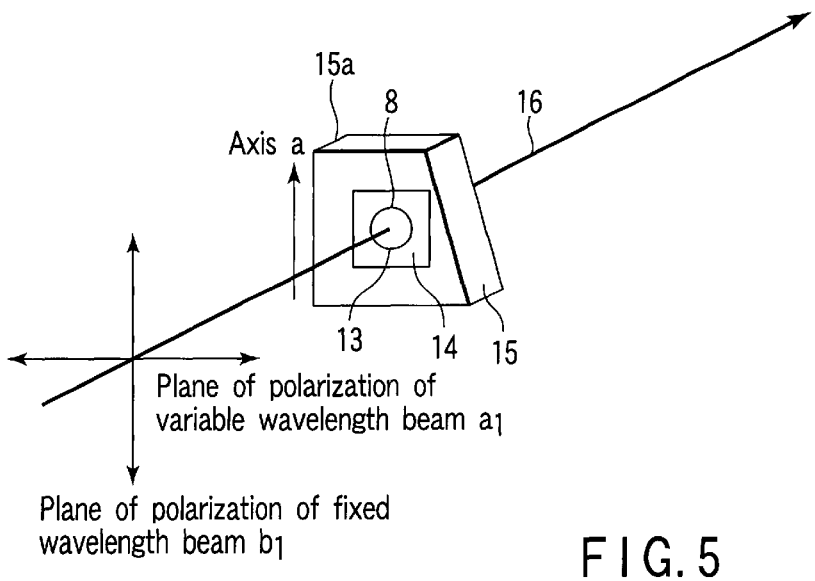
F I G. 5
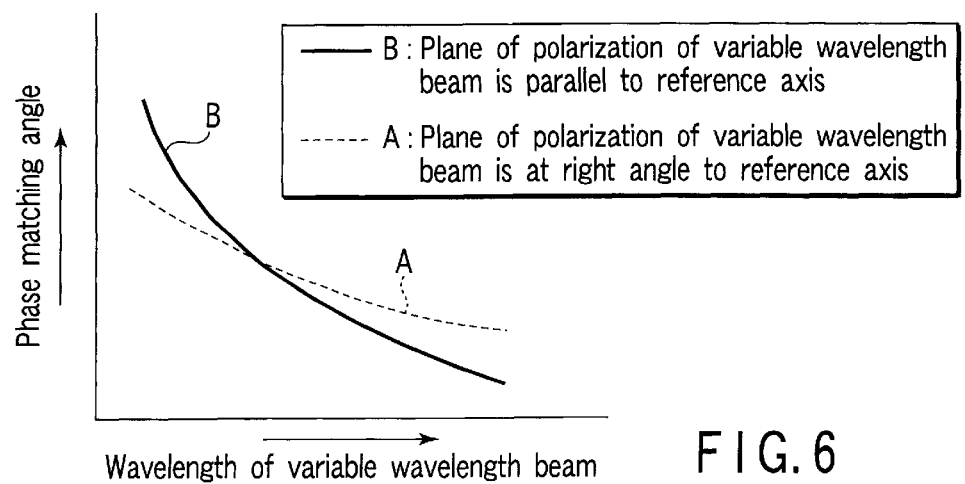
F I G. 6

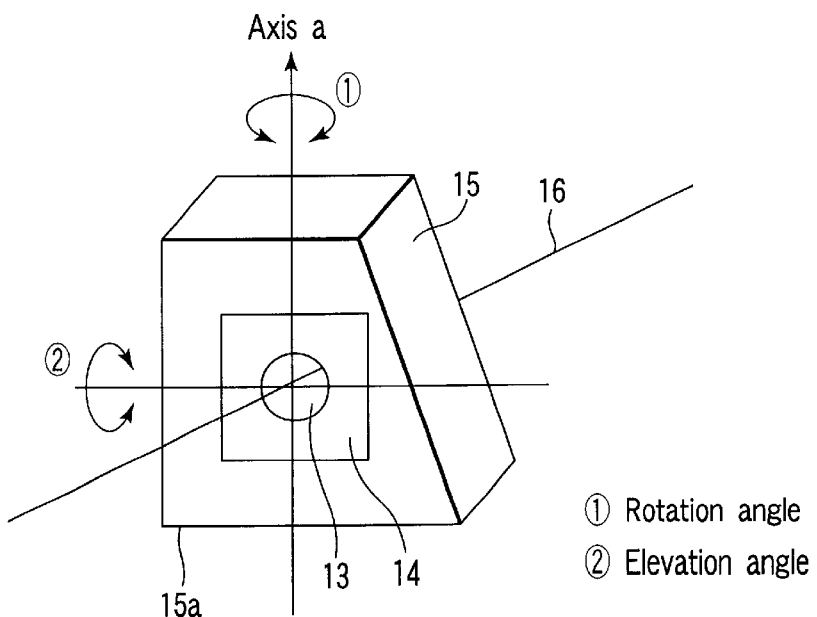
FIG. 11
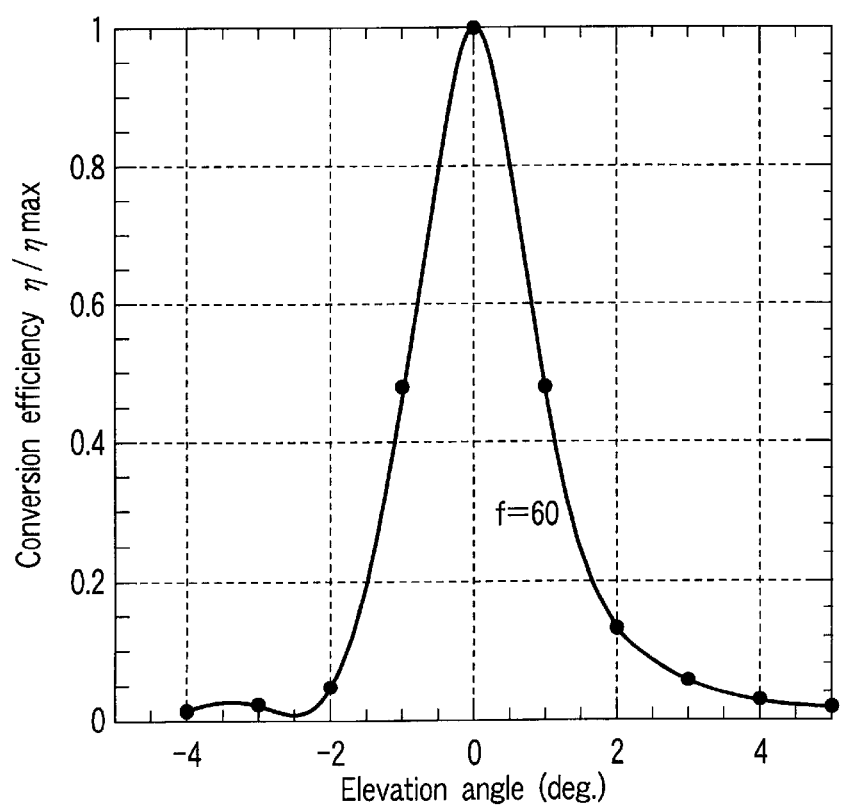
FIG. 12  Rotation angle dependency of SHG conversion efficiency Elevation angle dependency of SHG conversion efficiency

SUM FREQUENCY LIGHT GENERATION METHOD AND SUM FREQUENCY LIGHT GENERATION APPARATUS ADAPATBLE FOR WIDE-BAND WAVELENGTH CONVERSION

CROSS-REFERENCE TO RELATED APPLICATIONS

This application is based upon and claims the benefit of priority from the prior Japanese Patent Application No. 2001-074683, filed Mar. 15, 2001, the entire contents of which are incorporated herein by reference.

BACKGROUND OF THE INVENTION

1. Field of the Invention

The present invention relates to a sum frequency light generation method and a sum frequency light generation apparatus adaptable for wide-band wavelength conversion and more particularly to a sum frequency light generation method and a sum frequency light generation apparatus for obtaining an angular frequency by summing up angular frequencies possessed by two lights projected from a pair of separate light sources.

2. Description of the Related Art

In recent years, laser lights having various kinds of angular frequencies (wavelength) depending on application purpose have been employed in respective technical fields of high density memory, optical display light source, medical instrument, color printer and the like.

The wavelength range of laser light for use has been expanding from visible lights of red, orange, green, blue and the like to ultraviolet bands.

The lights having these respective wavelengths can be generated by means of each dedicated laser light source.

However, generally, a method of converting laser light to each wavelength through a nonlinear optical crystal has been actually employed because this system can be realized at a low cost with a relatively simple configuration.

As a technology for converting the wavelength through this nonlinear optical crystal, since before, a method in which second harmonic generation is generated through a nonlinear optical crystal (hereinafter referred to as type 1 phase matching crystal) capable of matching the phase (type 1) and converted has been employed.

According to this method, basically, the angular frequency of inputted laser light is multiplied by 2 through the type 1 phase matching crystal. A first light having an angular frequency $\omega_1$ and a second light having an angular frequency $\omega_2$, whose polarization directions are parallel to each other, are multiplexed through a type 1 phase matching crystal so as to convert to a light having a twofold angular frequency $2\omega_1$.

However, according to the wavelength conversion method through the type 1 phase matching crystal, if it is intended to convert two lights having each different frequency to a sum frequency generation light (SFG light) having a sum frequency of these frequencies, the first light having the angular frequency light $\omega_1$ and the second light having the angular frequency $\omega_2$, whose polarization directions are parallel to each other, are inputted to the type 1 phase matching crystal.

Thus, actually, three kinds of lights each having an angular frequency $2\omega_1$, $2\omega_2$, $\omega_1+\omega_2$ are produced.

Therefore, if the angular frequencies $\omega_1$ and $\omega_2$ are near each other, separation of two lights having angular frequencies $2\omega_1$ and $2\omega_2$ and sum frequency generation light having an angular frequency $\omega_1+\omega_2$ becomes difficult, so that it is impossible to pick up a desired light alone, which is a problem to be solved.

Further, if looking in terms of efficiency, actual conversion efficiency for converting to the sum frequency generation light having the angular frequency $\omega_1+\omega_2$ drops because excessive two lights having the angular frequencies $2\omega_1$ and $2\omega_2$ are outputted, which is another problem to be solved.

That is, the method and apparatus for generating the sum frequency generation light by wavelength conversion using the type 1 phase matching have such problems.

Thus, to solve this problem, a method of generating the sum frequency light generation using a nonlinear optical crystal (hereinafter type 2 phase matching crystal) capable of executing type 2 phase matching has been invented.

Here, the wavelength conversion based on the type 2 phase matching will be described in detail.

As described above, the wavelength conversion by type 1 phase matching multiplexes the first light having the angular frequency $\omega_1$ and the second light having the angular frequency $\omega_1$, with the polarization directions thereof being parallel to each other, so as to produce the light having the angular frequency $2\omega_1$ which is twofold.

Contrary to this, the wavelength conversion by type 2 phase matching multiplexes a first light having an angular frequency $\omega_1$ and a second light having an angular frequency $\omega_2$, with the polarization direction thereof being perpendicular to each other, so as to produce a light having an angular frequency $\omega_1+\omega_2$.

Because the wavelength conversion by the type 2 phase matching is not carried out but between lights having polarization directions perpendicular to each other, even when the first light having the angular frequency $\omega_1$ and the second light having the angular frequency $\omega_2$ are entered, different from the wavelength conversion by the type 1 phase matching, only the light having the angular frequency $\omega_1+\omega_2$ which is the SFG light is outputted to outside as wavelength converted light.

Further, because the wavelength conversion by the type 2 phase matching does not produce the light having the angular frequency $2\omega_1$ or the light having the angular frequency $2\omega_2$, efficiency of conversion to the SFG light having the angular frequency $\omega_1+\omega_2$ is excellent.

Thus, the wavelength conversion method which generates the SFG light using the type 2 phase matching crystal may be used for the purpose of obtaining a correlation signal between two optical signals and in recent years, an SFG light generating apparatus for that purpose has been developed.

FIG. 9 is a schematic structure diagram of a concrete apparatus based on the sum frequency light generation method using the type 2 phase matching crystal.

A first light "a" entered to an input terminal 1 from outside having a wavelength $\lambda_1$ (angular frequency $\omega_D$) and linearly polarized, is controlled in terms of its polarization direction by a polarization direction controller 2, so as to be directed at 90° with respect to a reference direction (0°) and after that, entered to a multiplexer 3.

On the other hand, a second light "b" entered to an input terminal 4 from outside, having a wavelength $\lambda_2$ (angular frequency $\omega_S$) and linearly polarized, is controlled in terms of its polarization direction by a polarization direction controller 5, so as to be directed to, for example, the reference direction (0°) and after that, entered to the multiplexer 3.

The multiplexer 3 composed of for example, a beam splitter and the like, reflects the first light "a" at right angle with a half mirror 3a while allowing the second light "b" to advance straight.

Thus, this multiplexer 3 multiplexes the entered first light "a" and the second light "b" with the polarization directions thereof being perpendicular to each other on the same optical axis.

The first light "a" and the second light "b" emitted from this multiplexer 3 with the polarization directions thereof being perpendicular to each other are entered to one face of the nonlinear optical material 6 which is cut to match with a phase matching direction corresponding to a purpose from the type 2 phase matching crystal.

This nonlinear optical material 6 emits a sum frequency light "c" having an angular frequency $\omega_D+\omega_D$ (wavelength $\lambda_3$) which is a sum of the angular frequencies $\omega_D$ and $\omega_S$ possessed by each of the first light "a" and the second light "b" with the polarization directions thereof being perpendicular to each other, to an output terminal 7 from the other face.

The phase matching direction will be explained in detail hereinafter.

For the sum frequency light to be generated, the velocity (phase velocity) of each incident light within crystal of a nonlinear optical material 6 needs to coincide with the velocity (phase velocity) of that sum frequency light within the crystal.

Such a direction in which these phase velocities coincide with each other most within the crystal of the nonlinear optical material 6 is called phase matching direction and if light is propagated in this direction, efficiency of the wavelength conversion is the maximum.

The phase matching direction will be described further with a refractivity ellipsoid 9 shown in FIG. 4A.

For example, a direction 12 of connecting an intersection 11 between a refractivity ellipsoid 9 about the first light having the angular frequency $\omega_D$, a refractivity ellipsoid 9 about the second light having the angular frequency $\omega_S$ and a refractivity ellipsoid 10 about the sum frequency light having the angular frequency ($\omega_D+\omega_S$) with the origin of the refractivity ellipsoids 9 and 10 is the phase matching direction.

In FIG. 4A, for simplification of a description, it is assumed that the refractivity ellipsoid about the second light having the angular frequency $\omega_S$ is equal to the refractivity ellipsoid about the first light having the angular frequency $\omega_D$.

An angle φ formed between a direction in which the phase matching direction 12 is projected to a plane containing axis "a" and axis "b" and the axis "a" of the crystal and an angle θ formed between the phase matching direction 12 and the axis "c" of the crystal as shown in FIG. 4B are called phase matching angle.

Generally, the nonlinear optical crystal allowing type 2 phase matching is cut out in the form of a rectangular solid or cylinder containing a plane 13 intersecting the aforementioned phase matching direction 12 and used such that the propagation direction of light coincides with the phase matching direction 12.

In this case, an angle (cutout angle) relative to the axis (axis "a", axis "b", axis "c") of the crystal when the nonlinear optical crystal is cut out is determined depending on the aforementioned phase matching angles φ and θ.

Because the refractivity ellipsoid differs depending upon the kind of the nonlinear optical crystal, wavelength of light propagating through the crystal and the polarization direction of the light relative to the axis of the nonlinear optical crystal, if these are determined, the aforementioned cutout angle is automatically determined.

For example, in case of 2-adamantylamino-5-nitropyridine (AANP), which is an organic nonlinear optical crystal, it has been well known that the phase matching angles φ and θ are 90° and 60° respectively when the wavelength of the first and second lights is 1.55 μm and the phase matching angles φ and θ are 60° and 90°, respectively when the wavelength of the first and second lights is 1.3 μm.

That is, because the crystal cut out for use under a wavelength of 1.55 μm has an angle θ of 90° as described above, the plane 13 intersecting the phase matching direction 12 is a plane parallel to the axis a.

In case of the SFG, if when the axis "a" is regarded as the reference axis, light having a polarization direction parallel to the reference axis and light having a polarization direction vertical to that reference axis are multiplexed and entered through such a crystal, the SFG light having a polarization direction parallel to the reference axis is obtained.

Because the crystal cut out for use under a wavelength of 1.3 μm has an angle θ of 90°, the plane 13 intersecting the phase matching direction 12 is a plane parallel to the axis c.

In case of the SFG, if when the axis "c" is regarded as the reference axis, light having a polarization direction parallel to the reference axis and light having a polarization direction vertical to that reference axis are multiplexed and entered through such a crystal, the SFG light having a polarization direction parallel to the reference axis is obtained.

Meanwhile, a specification of an ordinarily marketed nonlinear optical crystal has a description about the aforementioned reference axis.

Therefore, a technology for converting the entered first light "a" and second light "b" through the nonlinear optical crystal to light having a sum angular frequency of the respective angular frequencies can be a method of obtaining a sum frequency light effectively and easily by using the type 2 phase matching crystal as the nonlinear optical crystal as described above.

If under this method, the nonlinear optical material 6 corresponding to an application wavelength is employed so that an optical system (optical positional relation) which secures an incident angle corresponding to the nonlinear optical material 6 is prepared, various kinds of wavelengths can be obtained.

In recent years, a technology about conversion to a target wavelength in wide band without changing optical positional relation between respective polarization direction controllers 2 and 5, multiplexer 3 and nonlinear optical material 6 in the sum frequency light generating apparatus as shown in FIG. 9 has been demanded in a measuring instrument in communication filed.

Thesis ECOC '96 ThB1.2 and the like have stated that changing the wavelength of light while fixing the wavelength of the other inputted light by using KTP or AANP (2-admantyl 5-nitorpyrdine), which is a type 2 phase matching crystal, makes it possible to change a sum frequency light generation region to a wide band.

This thesis indicates conversion efficiency of the sum frequency light c outputted when the wavelength of one light is fixed to 1555 nm while the wavelength of the other light is changed between 1530 nm and 1580 nm.

The band width in which the obtained SFG light is generated is 35 nm in case of KTP if it is defined in the width of 3 dB and in case of AANP, it is about 40 nm.

However the conventional sum frequency light generation method and sum frequency light generating apparatus using the type 2 phase matching crystal described above has still following problems to be solved.

That is, as communication region in recent wavelength division multiplexing (WDM) transmission expands to 80 nm or more, SFG light generation band of 80 nm or more has been demanded in communication field of the measuring instrument.

However, the conventional sum frequency light generation method and apparatus just employing the type 2 phase matching crystal cannot convert the wavelength of 80 nm or more unless the nonlinear optical material 6 is replaced corresponding to a target wavelength or the relation in position of its optical components is changed.

As described above, if the band width in which a realized SFG light is generated is 35 nm in case of KTP and 40 nm in case of AANP if it is defined in the width of 3 dB, when the wavelength of one light is fixed to 1555 nm while the wavelength of the other light is changed between 1530 nm and 1580 nm.

BRIEF SUMMARY OF THE INVENTION

Accordingly, the present invention has been achieved in views of the above-described problem and therefore, an object of the present invention is to provide a sum frequency light generation method and a sum frequency light generation apparatus using type 2 phase matching crystal, capable of expanding its wavelength conversion bandwidth twice or more a conventional example.

Another object of the present invention is to provide a sum frequency light generation method and a sum frequency light generation apparatus capable of setting the center of its wavelength conversion band arbitrarily so as to meet wavelength conversion in a wider band.

To achieve the above described object, according to a first aspect of the present invention, there is provided a sum frequency light generation method comprising: receiving a fixed wavelength light ($b_1$) having a single polarization direction and a fixed wavelength ($\lambda_2$) to control the polarization direction of the fixed wavelength light; receiving a variable wavelength light ($a_1$) having a single polarization direction and a variable wavelength ($\lambda_1$) to control the polarization direction of the variable wavelength light so as to be perpendicular to the polarization direction of the fixed wavelength light; by entering the fixed wavelength light whose polarization direction is controlled and the variable wavelength light whose polarization direction is controlled into a nonlinear optical crystal (8) allowing type 2 phase matching, multiplexing the fixed wavelength light having an angular frequency $\omega_D$ and the variable wavelength light having an angular frequency $\omega_S$, with polarization directions thereof being perpendicular to each other, through the nonlinear optical crystal so as to produce a sum frequency light having an angular frequency $\omega_D+\omega_S$; and when multiplexing the fixed wavelength light and the variable wavelength light through the nonlinear optical crystal, controlling the polarization direction of the fixed wavelength so as to be parallel to a predetermined reference axis within a plane perpendicular to a phase matching direction (12) of the nonlinear optical crystal, wherein the predetermined reference axis is a single axis parallel to a crystal axis of the nonlinear optical crystal even when the wavelength of inputted light changes.

To achieve the above-described object, according to a second aspect of the present invention, there is provided a sum frequency light generation apparatus comprising: a first polarization direction controller (5) which receives a fixed wavelength light ($b_1$) having a single polarization direction and a fixed wavelength ($\lambda_2$) to control the polarization direction of the fixed wavelength light; a second polarization direction controller (2) which receives a variable wavelength light ($a_1$) having a single polarization direction and a variable wavelength ($\lambda_1$) to control the polarization direction of the variable wavelength light so as to be perpendicular to the polarization direction of the fixed wavelength light; a nonlinear optical crystal (8) allowing type 2 phase matching which, when the fixed wavelength light whose polarization direction is controlled by the first polarization direction controller and the variable wavelength light whose polarization direction is controlled by the second polarization direction controller are entered, multiplexes the fixed wavelength light having an angular frequency $\omega_D$ and the variable wavelength light having an angular frequency $\omega_S$, with the polarization directions thereof being perpendicular to each other so as to obtain a sum frequency light having an angular frequency $\omega_D+\omega_S$; and control means for, when multiplexing the fixed wavelength light and the variable wavelength light through the nonlinear optical crystal, controlling the polarization direction of the fixed wavelength so as to be parallel to a predetermined reference axis within a plane perpendicular to a phase matching direction (12) of the nonlinear optical crystal, wherein the predetermined reference axis is a single axis parallel to a crystal axis of the nonlinear optical crystal even when the wavelength of inputted light changes.

To achieve the above-described object, according to a third aspect of the present invention, there is provided a sum frequency light generation method in which a fixed wavelength light ($b_1$) having a single polarization direction and a fixed wavelength ($\lambda_2$) and a variable wavelength light ($a_1$) having a single polarization direction perpendicular to the fixed wavelength light and a variable wavelength ($\lambda_2$) are multiplexed on the same optical axis and the multiplexed fixed wavelength light and variable wavelength light are entered into a nonlinear optical crystal (8) allowing type 2 phase matching between the fixed wavelength light and the variable wavelength light, so that the nonlinear optical crystal emits a sum frequency light (c) of the fixed wavelength light and the variable wavelength light, comprising: with a first state in which the polarization direction of the variable wavelength light is set perpendicular to a predetermined reference axis in a plane substantially vertical to a phase matching direction (12) of the nonlinear optical crystal while the polarization direction of the fixed wavelength light is set parallel to the reference axis, detecting a first change rate of the phase matching direction of the nonlinear optical crystal when the wavelength of the variable wavelength light is changed; with a second state in which the polarization direction of the variable wavelength light is set parallel to the predetermined reference axis while the polarization direction of the fixed wavelength light is set perpendicular to the reference axis, detecting a second change rate of the phase matching direction of the nonlinear optical crystal when the wavelength of the variable wavelength light is changed; and setting each polarization direction of the fixed wavelength light and the variable wavelength light entered into the nonlinear optical crystal to each polarization direction set with the first state or the second state which detects a smaller change rate of the first change rate and the second change rate.

To achieve the above-described object, according to a fourth aspect of the present invention, there is provided a sum frequency light generation apparatus comprising: a multiplexer (3) which multiplexes an entered fixed wavelength light ($b_1$) having a single polarization direction and a fixed wavelength ($\lambda_2$) and a variable wavelength light ($a_1$) having a single polarization direction perpendicular to the polarization direction of the fixed wavelength light and a variable wavelength ($\lambda_1$) on the same optical axis (16); a nonlinear optical crystal (8) in which the fixed wavelength light and the variable wavelength light multiplexed by the multiplexer are entered and then a sum frequency light (c) of the fixed wavelength light and the variable wavelength light is emitted so as to allow type 2 phase matching between the fixed wavelength light and the variable wavelength light; and a polarization direction controller (5) which controls the polarization direction of the fixed wavelength light so as to be parallel to the reference axis of the nonlinear optical crystal while entering the fixed wavelength light into the nonlinear optical crystal.

To achieve the above-described object, according to a fifth aspect of the present invention, there is provided a sum frequency light generation apparatus comprising: a multiplexer (3) which multiplexes an entered fixed wavelength light ($b_1$) having a single polarization direction and a fixed wavelength ($\lambda_2$) and a variable wavelength light ($a_1$) having a single polarization direction perpendicular to the polarization direction of the fixed wavelength light and a variable wavelength ($\lambda_1$) on the same optical axis (16); a nonlinear optical crystal (8) in which the fixed wavelength light and the variable wavelength light multiplexed by the multiplexer are entered and then a sum frequency light (c) of the fixed wavelength light and the variable wavelength light is emitted so as to allow type 2 phase matching between the fixed wavelength light and the variable wavelength light; and a polarization direction controller (2, 5) which sets the polarization direction of the variable wavelength light to a direction perpendicular to a predetermined reference axis in a plane substantially vertical to a phase matching direction (12) of the nonlinear optical crystal while setting the polarization direction of the fixed wavelength light so as to be parallel to the predetermined reference axis, wherein the nonlinear optical crystal is 2-adamantyl amino-5-nitropyridine (AANP), which is an organic nonlinear optical crystal.

To achieve the above-described object, according to a sixth aspect of the present invention, there is provided a sum frequency light generation apparatus comprising: fixed wavelength light emitting means (20) for emitting a fixed wavelength light ($b_1$) having a single polarization direction and a fixed wavelength ($\lambda_2$); a multiplexer (3) which receives the fixed wavelength light and variable wavelength light ($a_1$) having a single polarization direction perpendicular to the polarization direction of the fixed wavelength light and a variable wavelength ($\lambda_1$) and multiplexes the fixed wavelength light and the variable wavelength light on the same optical axis (16); and a nonlinear optical crystal (8) in which the fixed wavelength light and variable wavelength light multiplexed by the multiplexer are entered and a sum frequency light (c) of the fixed wavelength light and the variable wavelength light is emitted so as to allow type 2 phase matching between the fixed wavelength light and the variable wavelength light, wherein the fixed wavelength light emitting means emits the fixed wavelength light so that the polarization direction of the emitted fixed wavelength light is parallel to a predetermined reference axis within a plane substantially vertical to a phase matching direction (12) of the nonlinear optical crystal.

To achieve the above-described object, according to a seventh aspect of the present invention, there is provided a sum frequency light generation apparatus according to the sixth aspect, wherein the nonlinear optical crystal is 2-adamantylamino-5-nitropyridine (AANP) which is an organic nonlinear optical crystal.

To achieve the above-described object, according to an eight aspect of the present invention, there is provided a sum frequency light generating apparatus according to the sixth aspect, wherein the fixed wavelength light emitting means is capable of emitting plural fixed wavelength lights each having a different wavelength and selectively emits any one of the plural fixed wavelength lights.

To achieve the above-described object, according to a ninth aspect of the present invention, there is provided a sum frequency light generation apparatus comprising: a multiplexer (3) which multiplexes an entered fixed wavelength light ($b_1$) having a single polarization direction and a fixed wavelength ($\lambda_2$) and a variable wavelength light ($a_1$) having a single polarization direction perpendicular to the polarization direction of the fixed wavelength light and a variable wavelength ($\lambda_1$) on the same optical axis (16); a nonlinear optical crystal (8) in which the fixed wavelength light and the variable wavelength light multiplexed by the multiplexer are entered and then a sum frequency light (c) of the fixed wavelength light and the variable wavelength light is emitted so as to allow type 2 phase matching between the fixed wavelength light and the variable wavelength light; incident angle changing means (30) for changing each incident angle of the fixed wavelength light and variable wavelength light into the nonlinear optical crystal; and a polarization direction controller (2, 5) which sets the polarization direction of the variable wavelength light so as to be perpendicular to a predetermined reference axis within a plane substantially vertical to a phase matching direction (12) of the nonlinear optical crystal while setting the polarization direction of the fixed wavelength light so as to be parallel to the predetermined reference axis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIGS. 4A and 4B are diagrams showing a procedure for obtaining the direction of phase matching in the AANP incorporated in the sum frequency light generation apparatus of FIG. 1;

FIG. 5 is a schematic diagram showing the structure of major portions of the sum frequency light generation apparatus of FIG. 1;

FIG. 6 is a diagram showing the relation between the wavelength of variable wavelength light and phase matching angle in the sum frequency light generation apparatus of FIG. 1;

FIG. 11 is a diagram for explaining an incident angle to the nonlinear optical crystal;

FIG. 12 is a diagram showing rotation angle dependency of second harmonic generation efficiency;

DETAILED DESCRIPTION OF THE INVENTION

Figure 1:
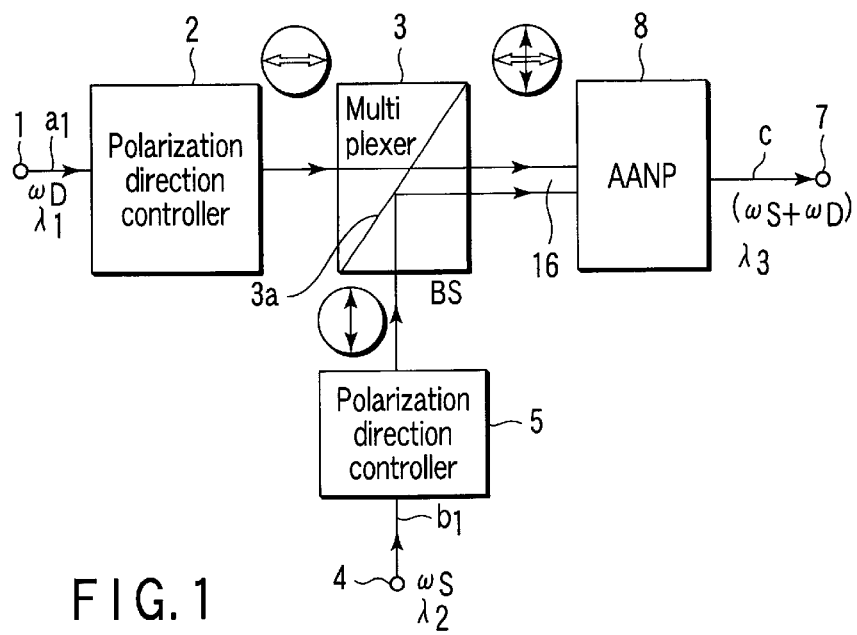
FIG. 1 is a block diagram showing a schematic structure of a sum frequency light generation apparatus according to a first embodiment of the present invention.

Reference will now be made in detail to the presently preferred embodiments of the invention as illustrated in the accompanying drawings, in which like reference numerals designate like or corresponding parts.

In order to achieve the aforementioned object, knowledge obtained by considering the relation between a crystalline axis of a nonlinear optical crystal and the polarization direction of incident light into the crystal by the inventors of the present invention will be described below.

Generally, a calculation method and experimental data about a change in second harmonic generation light due to an angular polarization from a phase matching angle in the nonlinear optical crystal have been well known.

Figure 13:
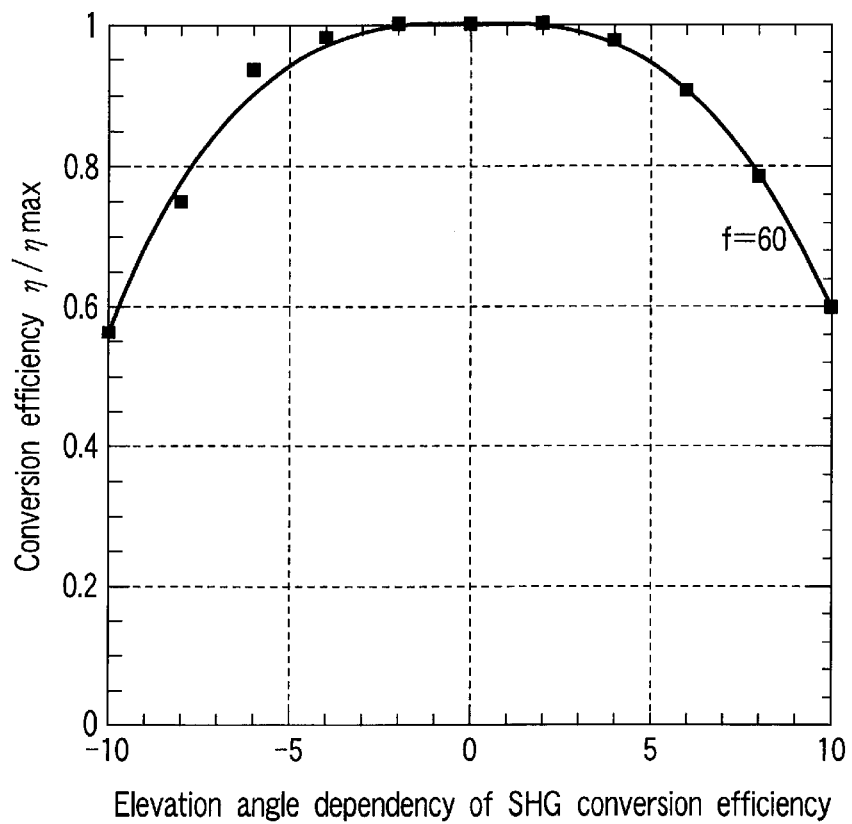
FIG. 13 is a diagram showing elevation angle dependency of the second harmonic generation efficiency.

For example, in case of AANP, if a change in output of SHG light shown in FIG. 12 due to an angular polarization from the phase matching angle relative to axis "a" and a change in output of SHG light shown in FIG. 13 due to an angular change (elevation angle) from the phase matching angle relative to an axis perpendicular to the axis "a" are compared, it is evident that the change of the former (FIG. 12) is smaller than the change of the latter (FIG. 13).

In other words, it becomes evident that the SHG is sensitive to the angular polarization relative to the axis "a" and that its generation amount changes insensitively to the angular polarization relative to the axis perpendicular to the axis a.

Thus, in an optical system using the nonlinear optical crystal allowing type 2 phase matching, the wavelength of one fixed wavelength light is not changed if the relation of positions of the optical components is not changed. Thus, there is no change in the optical axis due to aberration of the optical component or dispersion.

For this reason, in the optical system using the nonlinear optical crystal allowing the type 2 phase matching, when the polarization direction is set to the direction of an axis vertical to the axis a, the other light whose wavelength is changed changes in its optical axis due to aberration and dispersion. Therefore, the polarization direction is set so as to be parallel to the axis "a" so as to convert the wavelength.

Figure 9:
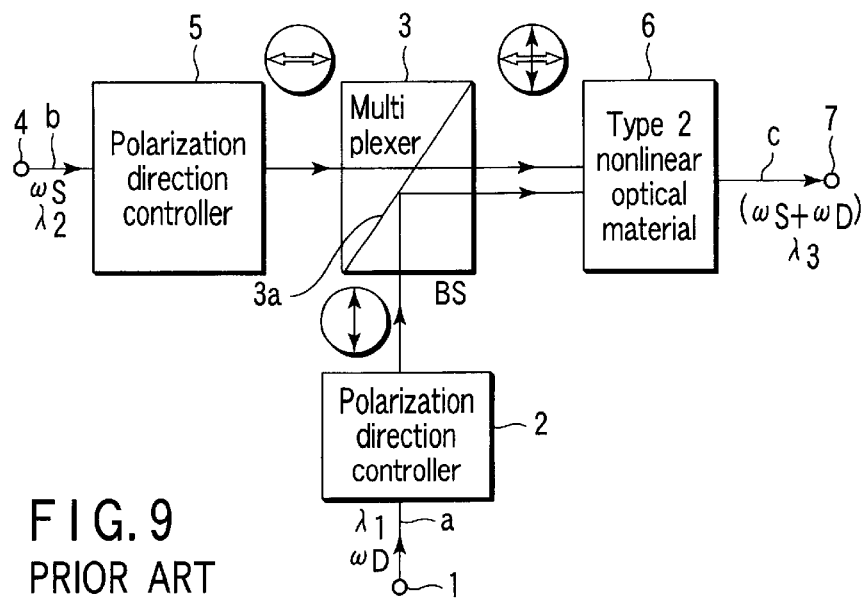
FIG. 9 is a block diagram showing a schematic structure of a conventional sum frequency light generation apparatus.
Figure 10A:
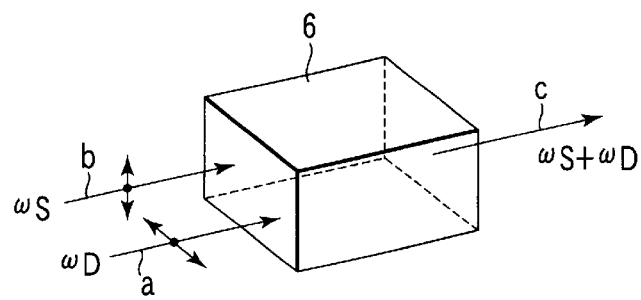
FIGS. 10A and 10B are diagrams for explaining optical characteristic of nonlinear optical crystal which allows type 2 phase matching.
Figure 10B:
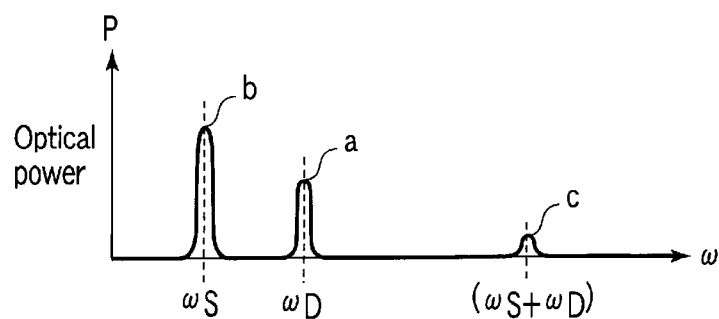

Referring to FIG. 9, a variable wavelength light is inputted as a first light "a" while a fixed wavelength light is inputted as a second light b.

According to the above-described thesis ECOC '96 ThB1.2, the fixed wavelength light and variable wavelength light are inputted under the conventional polarizing direction setting and the bandwidth of sum frequency light generation is 35 nm in case of KTP with 3 dB width and about 40 nm in case of AANP.

Although conventionally, the above-described design is adopted, the inventors of the present invention pay attention to the relation between the wavelength of the variable wavelength light and phase matching direction unlike conventionally.

Upon generating the sum frequency light, the nonlinear optical crystal allowing type 2 phase matching is set up so that optical axes of the variable wavelength light and fixed wavelength light which are multiplexed so that their polarization directions intersect each other almost coincide with each other and that the polarization directions of the variable wavelength light and the fixed wavelength light are parallel to or perpendicular to a reference axis of the crystal perpendicular to the phase matching direction.

Said predetermined reference axis is a single axis parallel to a crystal axis of said nonlinear optical crystal even when the wavelength of inputted light changes.

If with the incident angle (incident direction) of the variable wavelength light and fixed wavelength light fixed to the nonlinear optical crystal and the wavelength of the fixed wavelength light fixed, the wavelength of the variable wavelength light is changed, the phase matching direction is changed corresponding to that wavelength.

In this case, the smaller the difference between the light incident direction and the phase matching direction, the better the conversion efficiency becomes. Thus, it is preferable to set up the relation between such a reference axis in which the change in the phase matching direction is small even if the wavelength is changed and the polarization direction of the variable wavelength light.

Thus, the inventors of the present invention investigated the relation between the wavelength of the variable wavelength light and the phase matching direction. As a result, it has been made evident that there occurs a difference in the change amount of the phase matching direction when the wavelength of the variable wavelength light is changed depending upon whether the polarization direction of the variable wavelength light is in parallel to the reference axis of the nonlinear optical crystal or perpendicular thereto.

Characteristic A in FIG. 6 shows a state in which the polarization direction of the variable wavelength light is set up at right angle to the reference axis of the nonlinear optical crystal while the polarization direction of the fixed wavelength light is set up parallel to the reference axis of the nonlinear optical crystal (AANP).

Characteristic B in FIG. 6 shows a state in which the polarization direction of the variable wavelength light is set up parallel to the reference axis of the nonlinear optical crystal while the polarization direction of the fixed wavelength light is set up at right angle to the reference axis of the nonlinear optical crystal.

It is found preferable to, as indicated by the characteristic A, set up the polarization direction of the variable wavelength light at right angle to the reference axis of the nonlinear optical crystal while setting up the polarization direction of the fixed wavelength light parallel to the reference axis of the nonlinear optical crystal.

That is, if such a condition is set up, the change amount of the phase matching direction is small relative to a change in the wavelength of the variable wavelength light. Consequently, generation efficiency of the emitted sum frequency light can be made difficult to be affected by a change in the wavelength of the variable wavelength light.

In other words, if such a condition is set up, a necessary generation efficiency can be maintained in a wide range even if the wavelength of the variable wavelength light is changed.

The above-described setting condition is opposite to an optimum setting considered conventionally.

Figure 7:
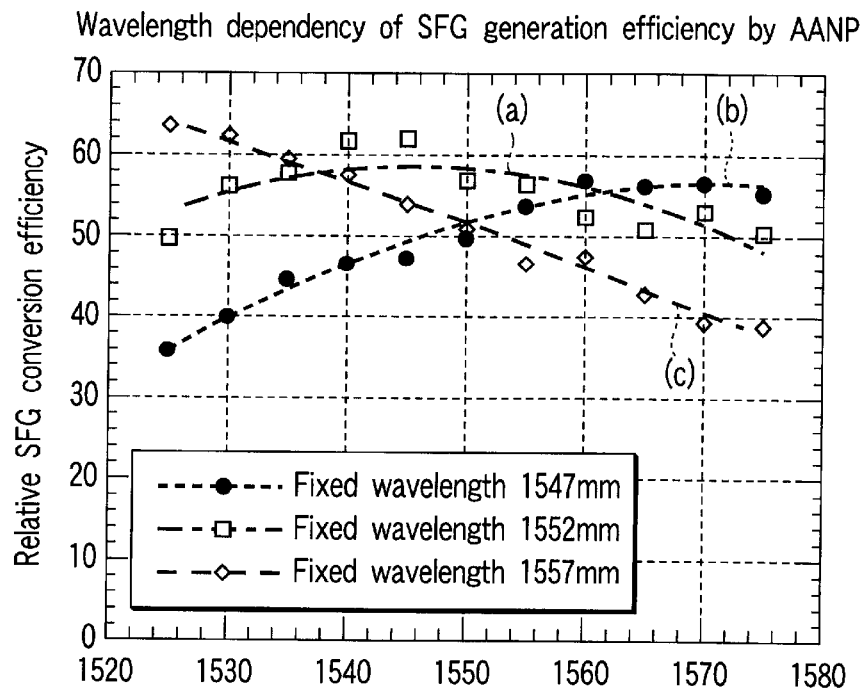
FIG. 7 is a diagram showing wavelength characteristic of sum frequency light generation efficiency in the AANP incorporated in the sum frequency light generating apparatus of FIG. 1.

FIG. 7 is a diagram showing a result of an experiment conducted under the above-described setting condition.

Although the nonlinear optical crystal is cut out corresponding to a phase matching direction of light having a wavelength scheduled to use as described above, FIG. 7 shows a result of a case where light having a different wavelength from the wavelength scheduled to use is entered as the fixed wavelength light also.

In FIG. 7, its abscissa axis indicates the wavelength (nm) of the variable wavelength light while its ordinate axis indicates relative SFG conversion efficiency.

More specifically, FIG. 7 shows conversion efficiencies with respect to the wavelength of the variable wavelength lights when the wavelength of the fixed wavelength light is set to 1547 nm (characteristic (b) in the same Figure), 1552 nm (characteristic (a) in the same Figure) and 1557 nm (characteristic (c) in the same Figure) in an optical system in which the first light "a" and the second light "b" are disposed such that their optical axes coincide with the phase matching direction in the AANP crystal cut out corresponding to the phase matching direction for light having the wavelength of 1552 nm.

FIG. 7 indicates that if the phase matching direction of the aforementioned AANP crystal coincides with the phase matching direction corresponding to the fixed wavelength light (that is, the wavelength of the fixed wavelength light is 1552 nm as scheduled to use), the bandwidth of sum frequency light generation is 80 nm under the width of 3 dB.

In that case, a portion having a high conversion efficiency appears with the wavelength of 1552 nm of the variable wavelength light as a peak as indicated by the characteristic (a) in the same Figure.

However, if a fixed wavelength light of the wavelength of 1547 nm is entered, the peak of the conversion efficiency is shifted to the side of longer wavelength as indicated by the characteristic (b) in the same Figure.

On the other hand, if a fixed wavelength light of the wavelength of 1557 nm is entered, the peak of the conversion efficiency is shifted to the side of shorter wavelength as indicated by the characteristic (c) in the same Figure.

From these facts, it is found that a variable wavelength light range (band) capable of obtaining a necessary sum frequency light generation efficiency can be shifted by changing the wavelength of the fixed wavelength light in the same optical system using the same AANP crystal.

Figure 8:
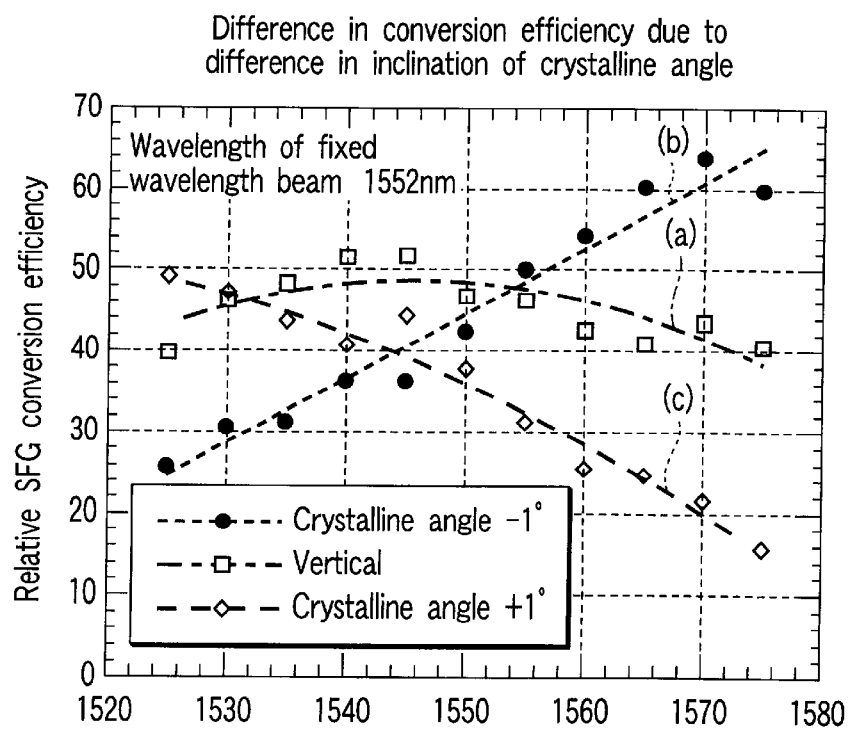
FIG. 8 is a diagram showing a difference in conversion efficiency due to a difference in the inclination of a crystal angle in the AANP incorporated in the sum frequency light generating apparatus of FIG. 1.

FIG. 8 shows conversion efficiency about the wavelength of the variable wavelength light when an angular shift around the axis "a" between the phase matching direction and optical axis is −1 degree (characteristic (b) in the Figure), 0 degree (characteristic (a) in the Figure) and +1 (characteristic (c) in the Figure) in an optical system capable of shifting the direction of the optical axis of light in which the fixed wavelength light and the variable wavelength light are multiplexed when the wavelength of the fixed wavelength light is 1552 nm in the AANP crystal cut out corresponding to the phase matching direction for light having the wavelength of 1552 nm.

The setting condition of this case is the same as FIG. 7 so that the polarization direction of the fixed wavelength light is set up parallel to the reference axis (axis "a" as described above in this case).

If the phase matching direction and the optical axis direction coincide with each other in FIG. 8, a portion having a high conversion efficiency appears when the wavelength of the variable wavelength light reaches a peak of 1552 nm as indicated by the characteristic (a) of the same Figure.

However, if the angular shift is −1 degree, the peak of the conversion efficiency is shifted to the side of longer wavelength as indicated by the characteristic (b) of the same Figure.

On the other hand, if the angular shift is +1 degree, the peak of the conversion efficiency is shifted to the side of shorter wavelength as indicated by the characteristic (c) of the same Figure.

This indicates that the wavelength range (band) of a variable wavelength light capable of obtaining a necessary sum frequency light generation efficiency can be shifted by changing an incident angle of light in the same optical system using the same AANP crystal.

The present invention is base upon the above-described knowledge.

Hereinafter, the sum frequency light generation method and the sum frequency light generating apparatus of the present invention achieved based on the above-described knowledge will be described below.

(First Embodiment)

FIG. 1 is a block diagram showing a schematic structure of a sum frequency light generating apparatus to which a sum frequency light generation method according to a first embodiment of the present invention is applied.

In FIG. 1, like reference numerals are attached to the same components as the sum frequency light generating apparatus shown in FIG. 9 and a description thereof is omitted.

The sum frequency light generating apparatus shown in FIG. 1 is different from the conventional sum frequency light generating apparatus shown in FIG. 9 in that AANP 8, which is an above-described organic nonlinear optical crystal, is incorporated in as the nonlinear optical crystal 6 and in the relation between the polarization direction of the variable wavelength light $a_1$, the fixed wavelength light $b_1$ which are incident to the AANP 8 and the reference axis of the crystal.

Figure 2:
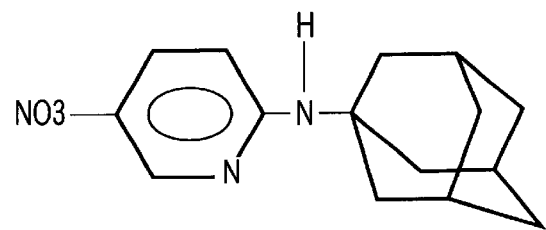
FIG. 2 is a diagram showing a molecular structure of AANP incorporated in the sum frequency light generation apparatus of FIG. 1.
Figure 3:
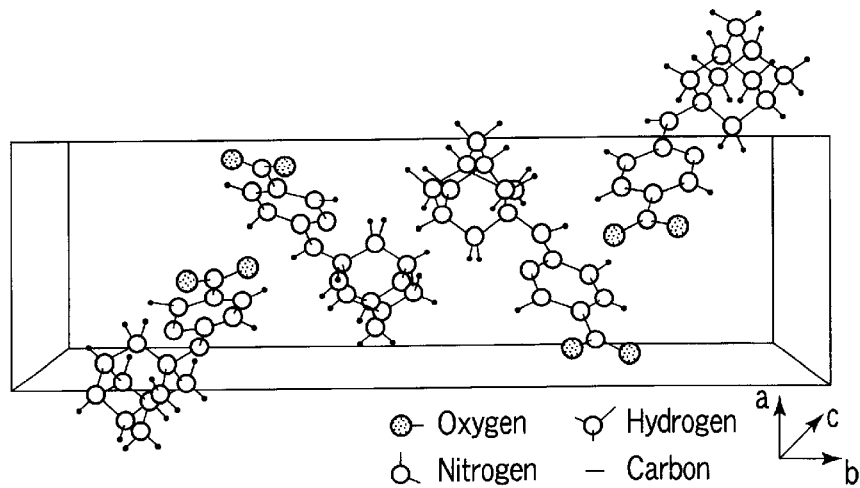
FIG. 3 is a diagram showing a crystalline structure of AANP incorporated in the sum frequency light generation apparatus of FIG. 1.

The AANP 8 has the molecular structure as shown in FIG. 2 and the crystalline structure as shown in FIG. 3.

"a", "b" and "c" in FIG. 3 indicate crystalline axes perpendicular to each other.

The phase matching direction 12 in the AANP 8, which is such an organic nonlinear optical crystal, is a direction which connects an intersection 11 between a refractivity ellipsoid 9 to an incident light (variable wavelength light $a_1$, fixed wavelength light $b_1$) and a refractivity ellipsoid 10 to a sum frequency light "c" with the coordinate home position in three-dimensional coordinates of x, y, z (a, b, c) of a crystal as described with reference to FIGS. 4A and 4B.

More specifically, this phase matching direction 12 is a direction indicated with phase matching angle $\phi=90°$, $\theta=60°$ when the wavelength of the incident light is 1.55 $\mu$m.

In this case, the reference axis is the axis "a" as described before.

The AANP 8 for use in the sum frequency light generating apparatus is cut out in the form of ellipsoid having a plane 13 perpendicular to the phase matching direction 12 or cylinder from a lump of the AANP crystal and supported by a supporting frame 15 of epoxy resin through an AR coating glass 14.

In this case, the posture of the ellipsoidal or cylindrical AANP 8 is set up such that the axis a, which is the reference axis of crystal existing in the plane 13 perpendicular to the phase matching direction 12, is parallel to a side 15a of the supporting frame 15.

An optical axis 16 of the variable wavelength light $a_1$ and fixed wavelength light $b_1$, which are multiplexed such that their polarization directions intersect each other, by means of a multiplexer 3 of FIG. 1 is set up perpendicular to the plane 13 of the AANP 8 which is perpendicular to the phase matching direction 12.

In this case, the polarization direction of the variable wavelength light $a_1$ is set up at right angle to the axis "a" which is the reference axis of the AANP 8 crystal as shown in FIG. 5.

Consequently, the polarization direction of the fixed wavelength light $b_1$ is set up parallel to the axis "a" which is the reference axis of the AANP 8 crystal.

In this case, the sum frequency light "c" is emitted in the direction of the optical axis 16 from an opposite face to the plane 13 of the AANP 8.

In the sum frequency light generating apparatus having such a structure, a variable wavelength light $a_1$, which is entered to an input terminal 1 from outside and has a single polarization direction and whose $\lambda_1$ (angular frequency $\omega_D$) is variable, is controlled by a polarization direction controller 2 so that its polarization direction coincides with the reference direction (direction of 0°) and then entered to the multiplexer 3.

On the other hand, the fixed wavelength light $b_1$, which is entered to an input terminal 4 from outside and has a single polarization direction and whose $\lambda_2$ (angular frequency $\omega_S$) is fixed, is controlled by means of a second polarization direction controller 5 so that it polarization direction is at right angle to the reference direction (direction of 0) and entered to the multiplexer 3.

Here, the multiplexer 3 composed of a beam splitter (BS) and the like allows the variable wavelength light $a_1$ to advance straight through a half mirror 3a and reflects the fixed wavelength light $b_1$ at right angle.

Therefore, the multiplexer 3 multiplexes the variable wavelength light $a_1$ and the fixed wavelength light $b_1$, which are entered thereinto and whose polarization directions intersect each other on the same optical axis 16.

The variable wavelength light $a_1$ and the fixed wavelength light $b_1$, which are emitted from this multiplexer 3 and whose polarization directions intersect each other, are projected to the plane 13 of the AANP which is an organic nonlinear optical crystal allowing type 2 phase matching to this variable wavelength light $a_1$ and the fixed wavelength light $b_1$.

The incident condition of the variable wavelength light $a_1$ and the fixed wavelength light $b_1$ to the AANP 8 has been already described with reference to FIG. 5.

Therefore, the AANP 8 which is an organic nonlinear optical crystal allowing type 2 phase matching emits the sum frequency light "c" having a sum angular frequency ($\omega_D + \omega_S$) (wavelength $\lambda_3$) which is a sum of respective angular frequencies $\omega_D$ and $\omega_S$ of the variable wavelength light $a_1$ and the fixed wavelength light $b_1$ emitted to the plane 13 to an output terminal 7 from the other plane.

The AANP 8, which is cut out for the wavelength of 1.55 $\mu$m as the nonlinear optical material 6, has been described above.

Then, a procedure for setting each polarization direction of the variable wavelength light $a_1$ and the fixed wavelength light $b_1$ in case of building a nonlinear optical crystal whose nonlinear characteristic has not been known in a sum frequency light generating apparatus as the nonlinear optical material 6 will be described.

Whether each polarization direction of the variable wavelength light $a_1$ and the fixed wavelength light $b_1$ should be set at right angle to or parallel to the reference axis of this nonlinear optical crystal when the nonlinear optical crystal is incorporated in is sometimes not clear.

In this case, the characteristic A and the characteristic B shown in FIG. 6 preliminarily are measured about this unknown nonlinear optical crystal using another optical testing instrument.

Then, each polarization direction of the variable wavelength light $a_1$ and the fixed wavelength light $b_1$ is set up in a direction specified by a characteristic measurement condition in which the change amount in the phase matching direction corresponding to a change in the wavelength of the variable wavelength light $a_1$ is small.

The respective polarization directions of the variable wavelength light $a_1$ and the fixed wavelength light $b_1$ in the sum frequency light generating apparatus of the first embodiment are set up by comparing the characteristic A with the characteristic B.

The sum frequency light generating apparatus of the first embodiment employs organic AANP unlike inorganic optical crystals such as $KTP(KH_2PO_4)$, $LN(LiNbO_3)$, $LT(LiTaO_3)$ and $KN(KNbO_3)$ as the nonlinear optical crystal.

The nonlinear conversion efficiency $\eta$ of the AANP, which is an organic nonlinear optical crystal, is much higher than the nonlinear conversion efficiency $\eta$ of an inorganic nonlinear optical crystal.

Therefore, the level of the sum frequency light "c" emitted from the AANP is high in the sum frequency light generating apparatus of the first embodiment or its conversion efficiency is high.

Further, because each polarization direction of the variable wavelength light $a_1$ and the fixed wavelength light $b_1$ is set up as described above, a change in the conversion efficiency to the sum frequency light "c" in the AANP is low even if the wavelength $\lambda_1$ of the variable wavelength light $a_1$ is changed.

As a result, the sum frequency light generating apparatus of the first embodiment can execute wavelength conversion in a wide band of 80 nm or more by defining in the width of 3 dB as shown in FIGS. 7 and 8.

(Second Embodiment)

Figure 14:
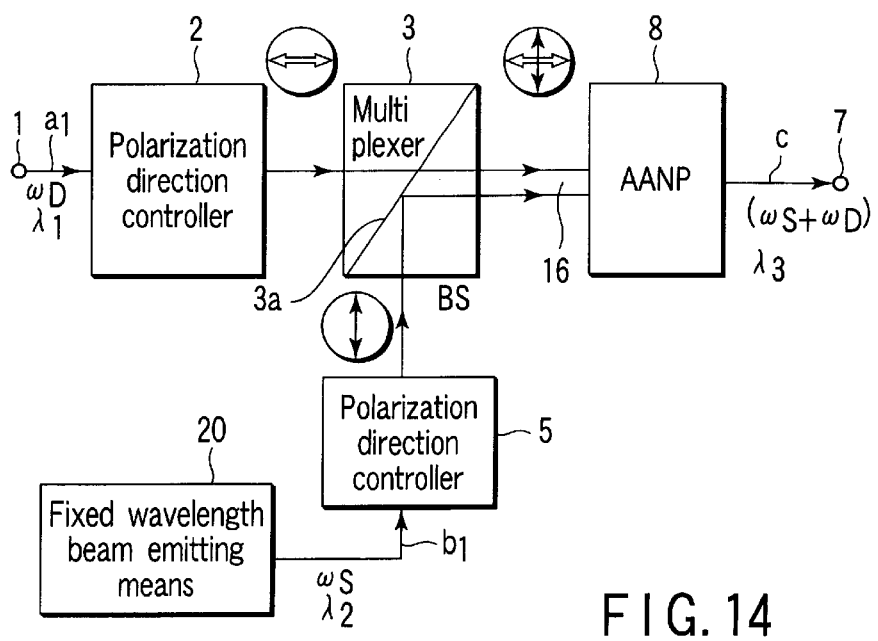
FIG. 14 is a block diagram showing a schematic structure of a sum frequency light generating apparatus according to a second embodiment of the present invention.

FIG. 14 is a block diagram showing a schematic structure of a sum frequency light generating apparatus according to a second embodiment of the present invention.

In FIG. 14, like reference numerals are attached to the same components as the sum frequency light generating apparatus shown in FIG. 1 and a description thereof is omitted.

The sum frequency light generating apparatus of FIG. 14 is different from the sum frequency light generating apparatus shown in FIG. 1 in that it is provided with fixed wavelength light emitting means 20 for emitting a fixed wavelength light ($b_1$) having a single polarization direction and whose wavelength ($\lambda_2$) is fixed.

This fixed wavelength light emitting means 20 emits light having the wavelength of 1552 nm and a polarization direction which becomes parallel to the reference axis when it is projected to the nonlinear optical crystal 8.

The polarization direction of light to be emitted from the aforementioned fixed wavelength light emitting means 20 is determined depending on an optical component which is located between the fixed wavelength light emitting means 20 and the nonlinear optical crystal 8, affecting the polarization direction.

If the AANP is used as the aforementioned nonlinear optical crystal 8, the axis "a" serves as the reference axis under the wavelength of 1552 nm.

Figure 15:
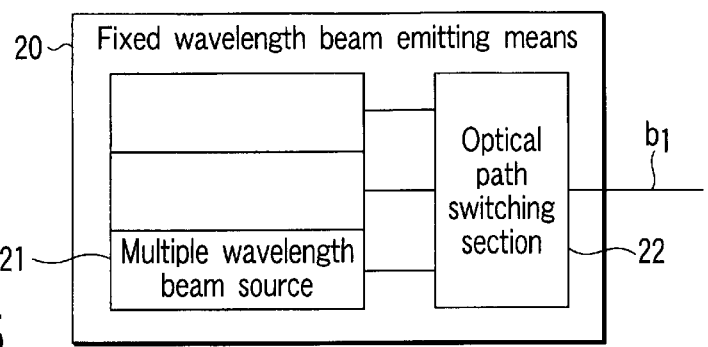
FIG. 15 is a block diagram showing a schematic structure of fixed wavelength light emitting means according to the second embodiment of the present invention.

In this case, it is permissible to change over the wavelength of an emitted light by constructing the fixed wavelength light emitting means 20 with a multiple wavelength light source 21 capable of emitting multiple wavelengths different in the wavelength and an optical path switching section 22 which selects a light of the multiple wavelength lights and emits it as shown in FIG. 15.

Alternatively, it is permissible to employ a variable wavelength light source capable of changing the wavelength as the fixed wavelength light emitting means 20 and fix that light source at a point in the variable wavelength range so as to emit a fixed wavelength light so that that point can be selected from multiple points in order to change the wavelength of an emitted light.

If the wavelength of light emitted from the fixed wavelength light emitting means 20 is capable of being switched to for example, three types, that is, 1547 nm, 1552 nm and 1557 nm, a sum frequency light generating apparatus capable of corresponding to a variable wavelength light in a wider band, not a single kind of light can be achieved.

(Third Embodiment)

Figure 16:
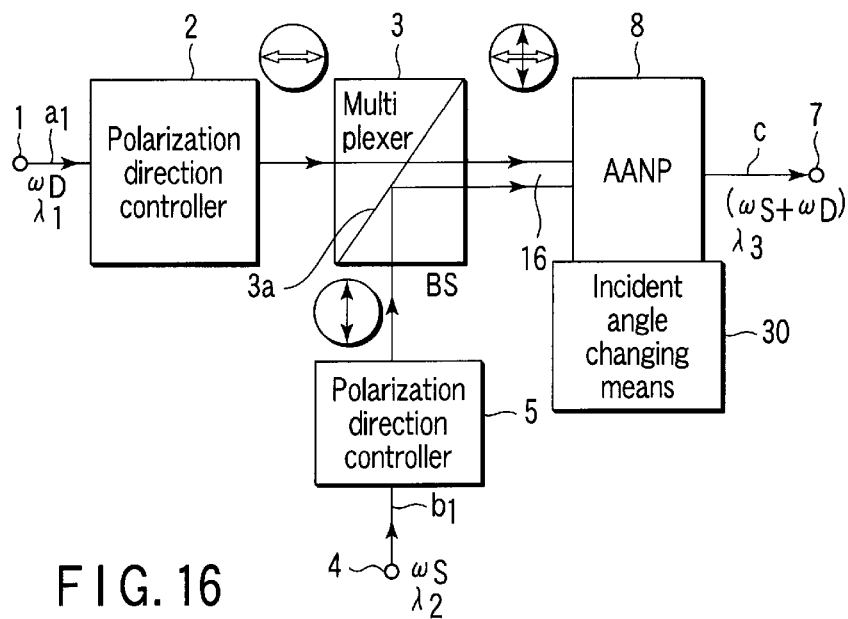
FIG. 16 is a block diagram showing a schematic structure of a sum frequency light generation apparatus according to a third embodiment of the present invention.

FIG. 16 is a block diagram showing a schematic structure of a sum frequency light generating apparatus according to a third embodiment of the present invention.

In FIG. 16, like reference numerals are attached to the same components as the sum frequency light generating apparatus shown in FIG. 1 and a description thereof is omitted.

The sum frequency light generating apparatus of FIG. 16 is different from the sum frequency light generating apparatus shown in FIG. 1 in that it is provided with incident angle changing means 30 for changing the incident angles to the nonlinear optical crystal 8 of the fixed wavelength light and the nonlinear optical crystal 8 to be entered to the nonlinear optical crystal 8.

Figure 17:
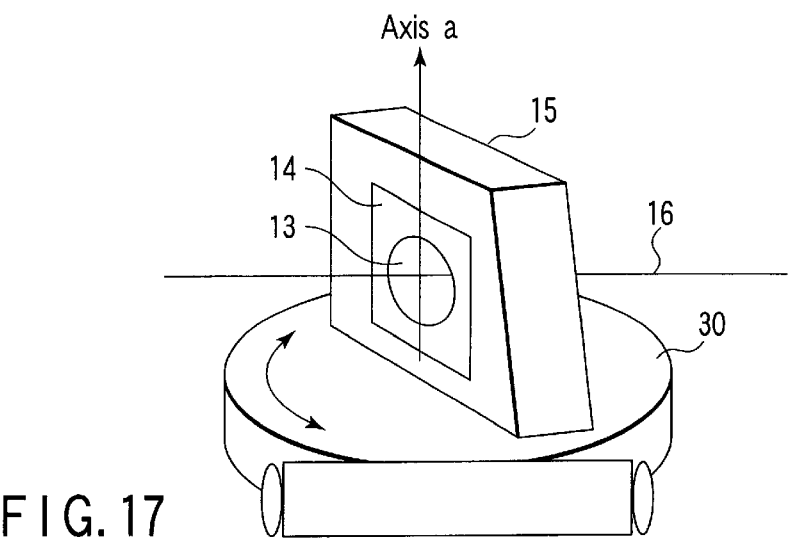
FIG. 17 is a diagram showing a schematic structure of incident angle changing means incorporated in the sum frequency light generating apparatus according to the third embodiment of the present invention.

The incident angle changing means 30 is so constructed of a fine rotation stage with micro ($\mu$) meter as shown in FIG. 17.

That is, as shown in FIG. 17, the AANP 8, which is the nonlinear optical crystal 8, is set up on the aforementioned fine rotation stage 30 with micro ($\mu$) meter and then, the incident angle of incident light to the AANP 8 is changed by rotating the fine rotation stage 30 with micro ($\mu$) meter.

For example, if with the wavelength of the fixed wavelength light being 1552 nm, the incident angle of incident light to the AANP 8 is capable of being switched to three types, that is, a state in which the plane 13 of the AANP 8 is at right angle to the optical axis and states in which that plane 13 is rotated at 1° to the right and left each with respect to the axis a, it is possible to form a sum frequency light generating apparatus capable of not only allowing incidence of light at right angle to the plane 13 but also corresponding to variable wavelength lights in a wider band.

Meanwhile, as a modification of the incident angle changing means 30, it is permissible to so construct that the respective polarization lights of the fixed wavelength light and the variable wavelength light projected to the nonlinear optical crystal 8 can be controlled by rotating the nonlinear optical crystal 8 itself instead of changing the incident angle of the fixed wavelength light and variable wavelength light projected to the nonlinear optical crystal 8.

In the sum frequency light generation method and the sum frequency light generating apparatus of the present invention, as described above, an optimum direction of each polarized light of the inputted variable wavelength light and fixed wavelength light is set up selectively in a condition that the type 2 phase matching to the nonlinear optical crystal is satisfied.

Further, in the sum frequency light generation method and the sum frequency light generating apparatus of the present invention, high efficiency wavelength conversion in a wide band is achieved by setting the polarization direction of the fixed wavelength light whose wavelength is fixed of the first light "a" and the second light parallel to the reference axis. Further, peak of the wavelength conversion efficiency can be matched with a desired wavelength by adjusting the wavelength setting for the fixed wavelength light and the incident angle of incident light to the nonlinear optical crystal (that is, adjusting the direction of the optical axis with respect to the phase matching direction).

Therefore, even if the wavelength of the inputted variable wavelength light is changed largely, the sum frequency light generation method and the sum frequency light generating apparatus of the present invention are capable of suppressing a drop of the level of outputted sum frequency light thereby making it possible to correspond to wavelength conversion in a wide band without changing the position of incorporated optical system.

Further, the sum frequency light generation method and the sum frequency light generating apparatus of the present invention are capable of matching a portion in which the wavelength conversion efficiency reaches its peak with transmission wavelength.

Further, in the sum frequency light generation method and sum frequency light generating apparatus of the present invention, by setting the polarization direction of the variable wavelength light whose wavelength is changed of the first light "a" and the second light "b" at right angle to the reference axis of the AANP while setting the polarization direction of the fixed wavelength light whose wavelength is fixed of the first light "a" and the second light "b" parallel to the reference axis, high efficiency wavelength conversion in a wider band can be achieved. Further, the conversion efficiency can be increased in a desired wavelength band by adjusting the wavelength setting for the fixed wavelength light and the incident angle of the incident light to the AANP.

Therefore, according to the present invention, as described in detail above, it is possible to provide a sum frequency light generation method and a sum frequency light generating apparatus employing the type 2 phase matching crystal, which are capable of widening its wavelength conversion band double or more the conventional example.

Further, according to the present invention, it is possible to provide a sum frequency light generation method and a sum frequency light generating apparatus capable of corresponding to a wavelength conversion in a wider band by setting the center of the wavelength conversion band arbitrarily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sum frequency light generation method comprising:
   receiving a first light having a single polarization direction and a fixed wavelength, and controlling the polarization direction of the first light;
   receiving a second light having a single polarization direction and a non-fixed wavelength, and controlling the polarization direction of the second light so as to be perpendicular to the polarization direction of the first light;
   by entering the first light whose polarization direction is controlled and the second light whose polarization direction is controlled into a nonlinear optical crystal allowing type 2 phase matching, multiplexing the first light having an angular frequency $\omega_D$ and the second light having an angular frequency $\omega_S$, so as to produce a sum frequency light having an angular frequency $\omega_D+\omega_S$; and
   when multiplexing the first light and the second light by the nonlinear optical crystal, controlling the polarization direction of the first light so as to be parallel to a predetermined reference axis within a plane perpendicular to a phase matching direction of the nonlinear optical crystal, and controlling the polarization direction of the second light so as to be perpendicular to the predetermined reference axis;
   wherein the predetermined reference axis is a single axis parallel to a crystal axis of the nonlinear optical crystal even when the wavelength of inputted light changes.

2. A sum frequency light generating apparatus comprising:
   a first polarization direction controller which receives a first light having a single polarization direction and a fixed wavelength, and which controls the polarization direction of the first light;
   a second polarization direction controller which receives a second light having a single polarization direction and a non-fixed wavelength, and which controls the polarization direction of the second light so as to be perpendicular to the polarization direction of the first light;
   a nonlinear optical crystal allowing type 2 phase matching into which the first light whose polarization direction is controlled by the first polarization direction controller and the second light whose polarization direction is controlled by the second polarization direction controller are entered, and which multiplexes the first light having an angular frequency $\omega_D$ and the second light having an angular frequency $\omega_S$, so as to obtain a sum frequency light having an angular frequency $\omega_D+\omega_S$; and
   control means for, when multiplexing the first light and the second light by the nonlinear optical crystal, controlling the polarization direction of the first light so as to be parallel to a predetermined reference axis within a plane perpendicular to a phase matching direction of the nonlinear optical crystal, and controlling the polarization direction of the second light so as to be perpendicular to the predetermined reference axis;
   wherein the predetermined reference axis is a single axis parallel to a crystal axis of the nonlinear optical crystal even when the wavelength of inputted light changes.

3. A sum frequency light generation method wherein first light having a single polarization direction and a fixed wavelength and a second light having a single polarization direction perpendicular to the first light and a non-fixed wavelength are multiplexed on a same optical axis, and wherein the multiplexed first light and second light are entered into a nonlinear optical crystal allowing type 2 phase matching between the first light and the second light, so that the nonlinear optical crystal emits a sum frequency light of the first light and the second light, said method comprising:
   with a first state in which the polarization direction of the second light is set perpendicular to a predetermined reference axis in a plane substantially vertical to a phase matching direction of the nonlinear optical crystal while the polarization direction of the first light is set parallel to the reference axis, detecting a first change rate of the phase matching direction of the nonlinear optical crystal when the wavelength of the second light is changed;
   with a second state in which the polarization direction of the second light is set parallel to the predetermined reference axis while the polarization direction of the first light is set perpendicular to the reference axis, detecting a second change rate of the phase matching direction of the nonlinear optical crystal when the wavelength of the second light is changed; and
   setting each polarization direction of the first light and the second light entered into the nonlinear optical crystal to each polarization direction set with the first state or the second state which detects a smaller change rate of the first change rate and the second change rate, wherein the predetermined reference axis is a single axis parallel to a crystal axis of the nonlinear optical crystal even when the wavelength of inputted light changes.

4. A sum frequency light generating apparatus comprising:
   a multiplexer which multiplexes a first light having a single polarization direction and a fixed wavelength and a second light having a single polarization direction perpendicular to the polarization direction of the first light and a non-fixed wavelength on a same optical axis;
   a nonlinear optical crystal in which the first light and the second light multiplexed by the multiplexer are entered and from which a sum frequency light of the first light and the second light is emitted so as to allow type 2 phase matching between the first light and the second light; and a polarization direction controller which controls the polarization direction of the first light so as to be parallel to a reference axis of the nonlinear optical crystal while the first light enters into the nonlinear optical crystal, and which controls the polarization direction of the second light so as to be perpendicular to the reference axis of the nonlinear optical crystal while the second light enters the nonlinear optical crystal.

5. A sum frequency light generating apparatus comprising:

a multiplexer which multiplexes a first light having a single polarization direction and a fixed wavelength and a second light having a single polarization direction perpendicular to the polarization direction of the first light and a non-fixed wavelength on a same optical axis;

a nonlinear optical crystal in which the first light and the second light multiplexed by the multiplexer are entered and from which a sum frequency light of the first light and the second light is emitted so as to allow type 2 phase matching between the first light and the second light; and a polarization direction controller which sets the polarization direction of the second light to a direction perpendicular to a predetermined reference axis in a plane substantially vertical to a phase matching direction of the nonlinear optical crystal while setting the polarization direction of the first light so as to be parallel to the predetermined reference axis;

wherein the nonlinear optical crystal is 2-adamantyl amino-5-nitropyridine (AANP), which is an organic nonlinear optical crystal, and wherein the predetermined reference axis is a single axis parallel to a crystal axis of the nonlinear optical crystal even when the wavelength of inputted light changes.

6. A sum frequency light generating apparatus comprising:

light emitting means for emitting a first light having a single polarization direction and a fixed wavelength;

a multiplexer which receives the first light and a second light having a single polarization direction perpendicular to the polarization direction of the first light and a non-fixed wavelength, and which multiplexes the first light and the second light on a same optical axis; and a nonlinear optical crystal in which the first light and the second light multiplexed by the multiplexer are entered and from which a sum frequency light of the first light and the second light is emitted so as to allow type 2 phase matching between the first light and the second lights;

wherein the first light emitting means emits the first light so that the polarization direction of the first light is parallel to a predetermined reference axis within a plane substantially vertical to a phase matching direction of the nonlinear optical crystal, and wherein the predetermined reference axis is a single axis parallel to a crystal axis of the nonlinear optical crystal even when the wavelength of inputted light changes.

7. A sum frequency light generating apparatus according to claim 6, wherein the nonlinear optical crystal is 2-adamantylamino-5-nitropyridine (AANP) which is an organic nonlinear optical crystal.

8. A sum frequency light generating apparatus according to claim 6, wherein the first light emitting means is capable of emitting plural fixed wavelength lights each having a different wavelength and selectively emits any one of the plural fixed wavelength lights.

9. A sum frequency light generating apparatus comprising:

a multiplexer which multiplexes a first light having a single polarization direction and a fixed wavelength and a second light having a single polarization direction perpendicular to the polarization direction of the first light and a non-fixed wavelength on a same optical axis;

a nonlinear optical crystal in which the first light and the second light multiplexed by the multiplexer are entered and from which a sum frequency light of the first light and the second light is emitted so as to allow type 2 phase matching between the first light and the second light;

incident angle changing means for changing each incident angle of the first light and second light into the nonlinear optical crystal; and a polarization direction controller which sets the polarization direction of the second light so as to be perpendicular to a predetermined reference axis within a plane substantially vertical to a phase matching direction of the nonlinear optical crystal while setting the polarization direction of the first light so as to be parallel to the predetermined reference axis;

wherein the predetermined reference axis is a single axis parallel to a crystal axis of the nonlinear optical crystal even when the wavelength of inputted light changes.

* * * * *